Figure 3:
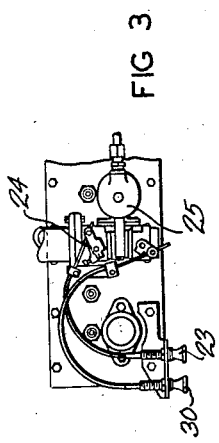

Jan. 7, 1941.	C. H. VAUPEL	2,228,098
ENGINE STARTING
Filed Oct. 14, 1938	3 Sheets-Sheet 1

INVENTOR
CARL H. VAUPEL
BY Paul L. Keohue
ATTORNEY

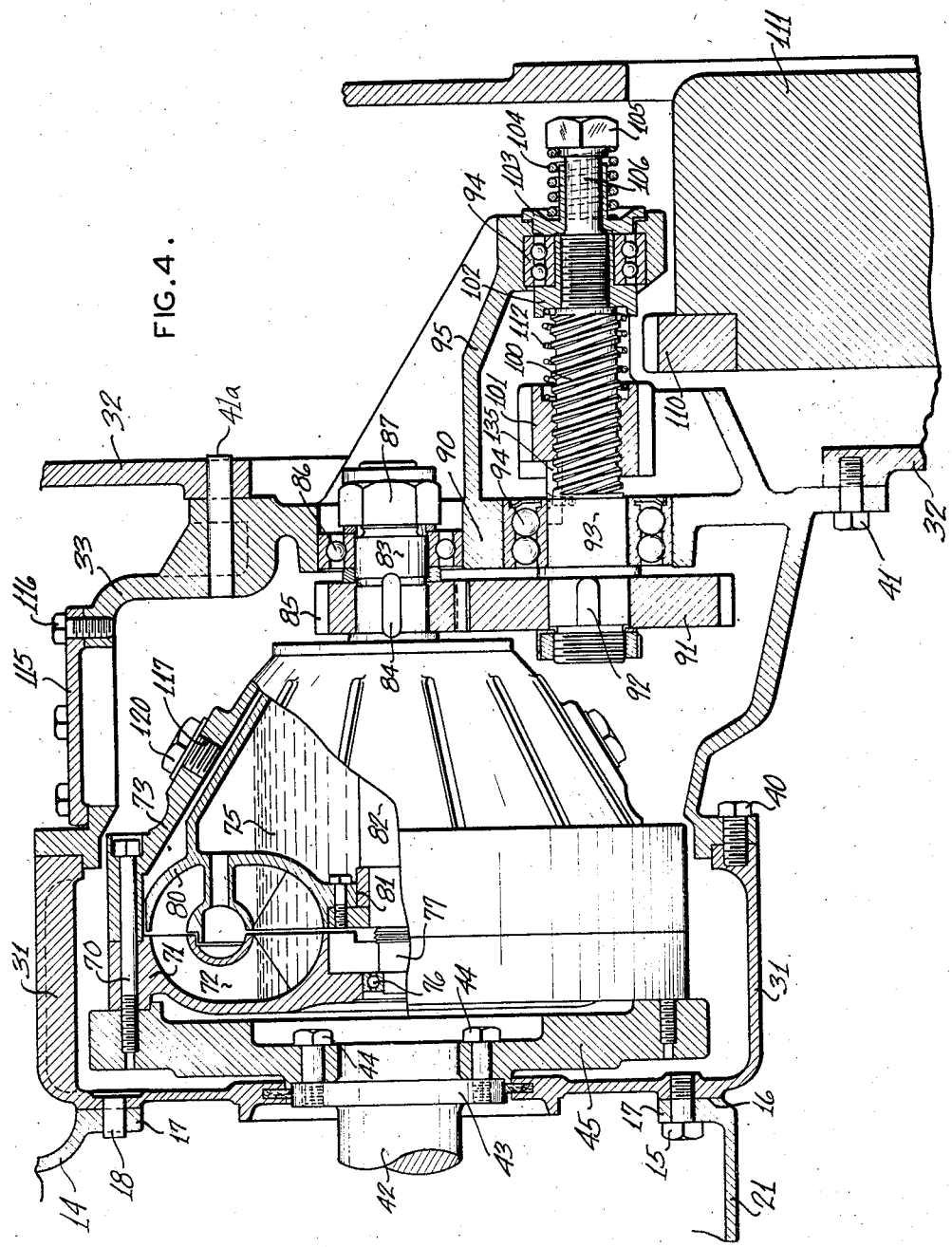

Jan. 7, 1941.   C. H. VAUPEL   2,228,098
ENGINE STARTING
Filed Oct. 14, 1938   3 Sheets-Sheet 3

INVENTOR
CARL H. VAUPEL
BY
ATTORNEY

Patented Jan. 7, 1941

2,228,098

UNITED STATES PATENT OFFICE 2,228,098

ENGINE STARTING

Carl H. Vaupel, White Plains, N. Y., assignor to Fairbanks, Morse & Co., Chicago, Ill., a corporation of Illinois Application October 14, 1938, Serial No. 234,973

2 Claims. (Cl. 123—179)

This invention relates to improvements in engine starting; broadly expressed, the invention embraces both an improved method and apparatus for initiating the operation of driven apparatus by means of an associated prime mover, but by way of example, is described in its application to the coupling of an internal combustion engine and an engine used for the starting thereof.

Attempts have heretofore been made to utilize, for example, a small, high speed internal combustion engine as a prime mover for putting in motion a larger engine, as during the starting period thereof. Such assemblies have, however, met with only indifferent success, due chiefly to the lack of suitable coupling mechanism between the engines. The usual earlier practices involved the use of a friction clutch associated with the relatively small starting engine, and a Bendix type drive through which this clutch was connected to the main engine. The Bendix type of drive is excellently adapted for use in starting operation wherein the prime mover consists, say of a small electric motor, as in automotive practice, and wherein, in case it is impossible to start rotation of the main engine, the electric motor may be brought to an abrupt stop, without appreciable hazard of breakage of any part of the drive. It may here be noted that the reference to this type of drive as the "Bendix" is used solely for brevity, and not in any restricting sense, but is intended generally herein to indicate those types of connection in which a drive pinion is threadedly connected to its shaft, and displaced axially into driving position through rotation of the shaft by which it is carried. Under the conditions prevailing with older starting combinations, it has been found that when the starting engine is actuating the Bendix drive under conditions such that the main engine (one of Diesel type for example) is difficult to start, the Bendix mechanism is frequently operatively introduced between, and so subjected to the effects of the large, stationary inertia of the main engine, and the substantial inertia of the starting engine flywheel, due to the rapid rotation thereof. It resulted that the helical thread on the Bendix drive, or even more often the gear teeth on the pinion, were frequently broken. Experience has shown that a friction clutch of a size to transmit the starting engine torque without slip, is furthermore extremely difficult to engage without exhibiting a "grab" effect, such as to result in breakage of the Bendix drive under the above, inevitably-encountered conditions. Furthermore, a friction type of clutch would not, of itself, operate to release the starting engine in case the main engine, such as a Diesel, refused to turn over immediately or readily, with the result that the starting engine very often stalls, and requires repeated hand cranking.

It is for the purpose of obviating the foregoing difficulties and shortcomings of engine starting combinations of the older types, that the present invention is primarily directed, and has for its primary object.

Yet another object of the invention is attained in the provision of an improved combination of couplings for use between a starting engine and a main engine, such as to permit an improved flexibility of control of the main engine through the throttle of the starting engine, and such as to prevent stalling of the starting engine, breakage of drive connections and is further such that it is impossible to break the parts of the drive.

Yet another object of the invention may be stated as contained in an improved regulation of the torque-slip characteristics of certain fluid couplings heretofore known as to general type, but utilized in an improved manner in connection with the present invention.

Still another object of the invention is attained in an improved manual control of a Bendix type drive, such as to enable the drive pinion or like element of the connection to be smoothly brought into engagement with the main engine ring gear or the like, under manual control, and prior to the translation of any appreciable starting torque to the main engine.

Figure 2:
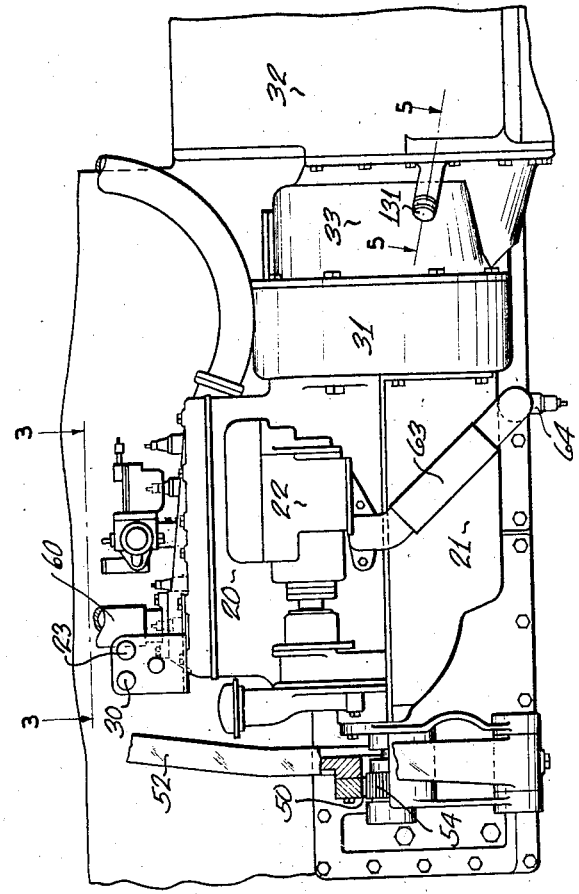
Figure 1:
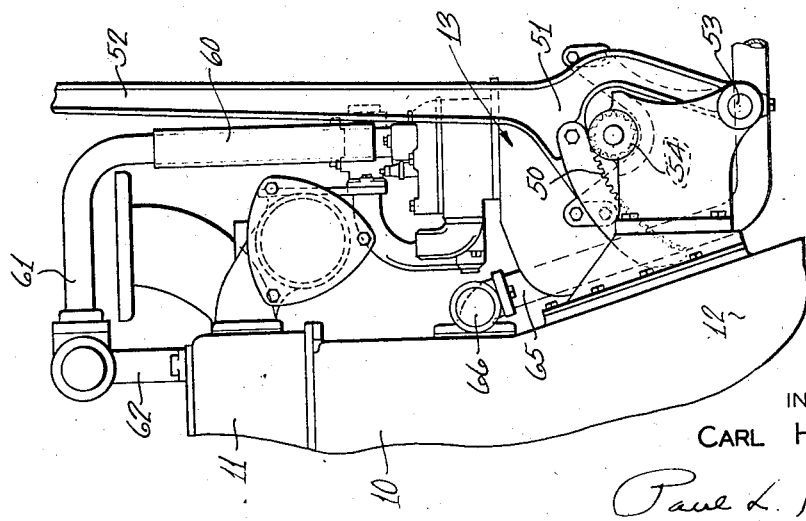
Figure 5:
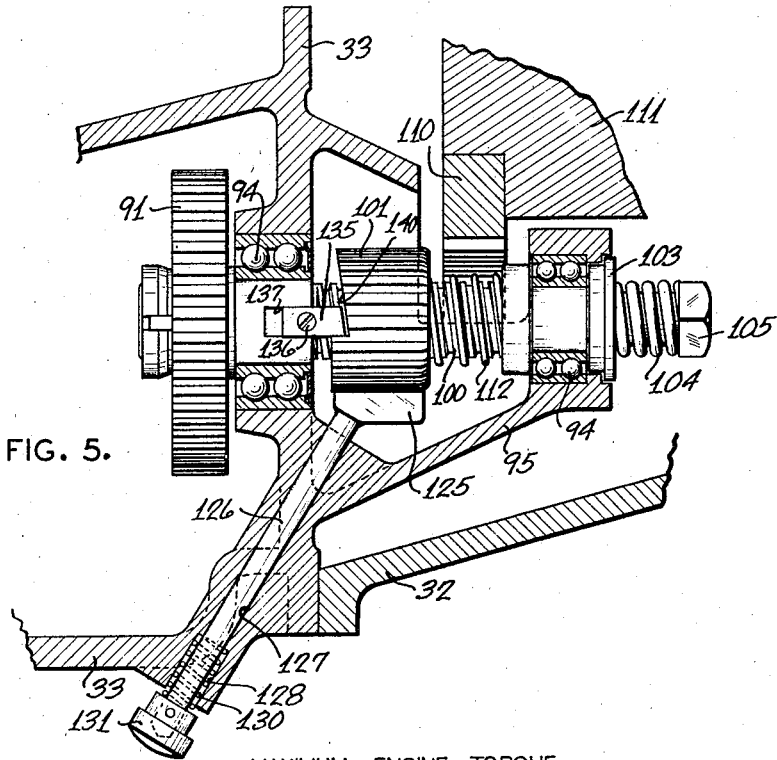
Figure 6:
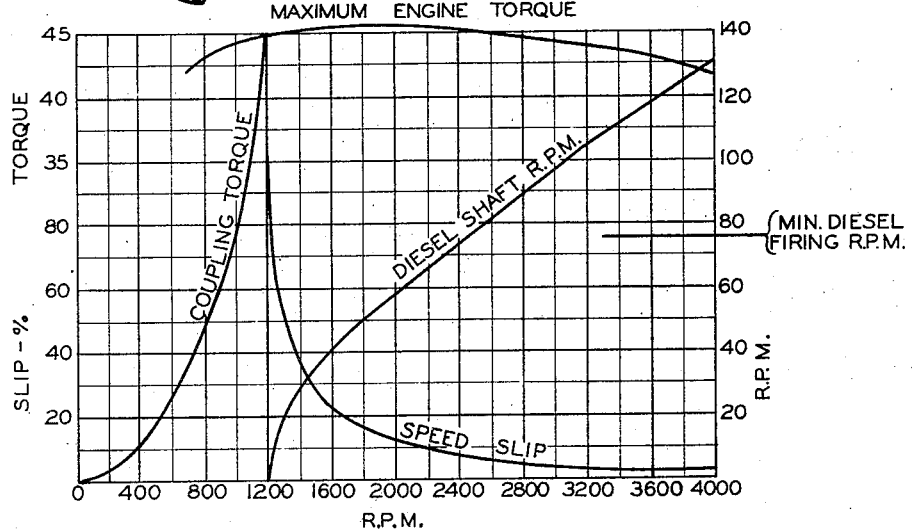

The foregoing and still further objects will appear as the description proceeds, particularly as read in connection with the accompanying drawings forming a part of the specification, and in which:

Fig. 1 is a fragmentary end elevation of a Diesel engine and a starting engine combination suitable for the practice of the present invention; Fig. 2 is a side elevation of the assembly shown by Fig. 1; Fig. 3 is a fragmentary top or plan view of the throttle and control assembly of the starting engine, as same would appear when viewed from line 3—3 of Fig. 2; Fig. 4 is a vertical, sectional elevation of the coupling and drive housing associated with the starting and main engines, and showing a part of the hydraulic coupling casing broken away to illustrate the general nature of certain of the coupling elements therein; Fig. 5 is a fragmentary section illustrating certain details of the Bendix drive assembly as utilized in the example disclosed, to connect the hydraulic coupling and the main engine, this figure being taken as viewed along line 5—5 of Fig. 2, and Fig. 6 is a graphic representation showing the coupling torque curve, the starting-engine torque curve, together with a graph-curve showing of main engine speed as well as speed-slip through the coupling assembly.

Referring now by characters of reference to the drawings, which represent a presently preferred, but only exemplary embodiment of the invention, the main engine to be started is indicated at 10, and includes a head portion 11 and a case or frame 12 by which is indirectly detachably carried the starting engine, indicated generally at 13. The attachment of the starting engine 13 for support thereof, is effected as by bolting flanges 17 (Fig. 4) on an inturned end extension of the crank case or frame 14 of the starting engine and through cap screws 15 and dowel pins 18, to a seating surface 16 on an end of the coupling housing 31, hereinafter described, and which is carried by the main engine. This form of support and mounting of the starting engine offers a distinct advantage over a distinct physical separation of the engines, in that it assures alignment of the starting engine with the main engine at all times, and serves to reduce the length of fluid connections between the engines, as hereinafter described in more detail.

The main engine consists, for example, of a Diesel unit, which as warranting engine-starting provisions, is usually of substantial size. In most installations the Diesel is of a relatively slow-speed, heavy-duty type as compared with the starting engine, the latter being usually of a smaller, high speed four-cycle type, although the invention in its broader aspects contemplates the usage of other types of both main and starting engines; for example, a compressed air motor may be used as the starting engine, as may be any other suitable type of prime mover. In the assembly selected for disclosure, the starting engine 13 is of four-cylinder four-cycle type, the cylinder block being indicated generally at 20 and the crank case portion at 21. It may be magneto-ignited as through the unit 22, and is preferably susceptible of a wide range of speed regulation, as through a throttle control 23 operating on the usual butterfly valve arm 24 (Fig. 3) in conjunction with the carburetor 25. A choke control 30 is conveniently disposed, for starting, proximate to the throttle control 23.

The mounting of the starting engine is such that the flywheel housing 31 is located in the vicinity of but spaced from the flywheel housing 32 of the main engine. Intervening these housings is an intermediate casing section 33 which is preferably flange-bolted to the members 31 and 32, the arrangement in assembly of these parts best appearing from Fig. 2. By reference to Fig. 4 it will better appear that the housing element 31 is flange-connected to the case 21 of the starting engine as though the cap screws or the like 15 and dowels 18, while the casing elements 31 and 33 are similarly assembled through cap screws 40, and the member 33 in turn detachably assembled to the housing 32 of the main engine as through bolts or screws 41 and dowels 41A.

In Fig. 4 is shown a fragmentary portion 42 of the starting engine crank shaft. This is flanged as at 43, and the flange secured as by cap screws or the like 44, to a rotatable member 45. This may of itself serve as the flywheel for the starting engine, in case a separate flywheel (not shown) is not provided on the shaft section 42. As shown however, the member 45 is included in the housing 31 as a part of the hydraulic coupling assembly, hereinafter to be referred to by way of further description.

The starting engine is or may be of conventional design and construction, and hence no more than the foregoing brief description thereof is necessary. As a convenience for starting the auxiliary or starting engine, there is provided a manual cranking mechanism of rack and pinion type, the rack element 50 of which is carried by a rockable frame 51 provided with a handle 52, the frame being mounted on a fixed pivot 53. The rack 50 enmeshes with a pinion 54, unidirectionally associated, through pawls or the like (not shown), with one end of the starting engine crank shaft. It is obvious from the description of this starter, that a quick sharp pull in one direction of the lever 52 will serve to spin the starting engine, and normally to bring it up to firing speed.

It is a distinct preference that both the starting engine 13, if of internal combustion type, and main engine 10, be liquid cooled, and that each be provided with a cooling jacket structure; further that the jackets of the two engines be connected into the same circulating system so as to enable utilization of the heating of the jacket water in the starting engine, to warm the cylinder structure, jackets and oil in the main engine, whereby to aid in obviating the breakaway resistance of the main engine. This is obviously of particular advantage under conditions of low ambient temperature, as during the winter months. The noted interconnection of the circulatory systems of the two engines is conveniently effected through a pipe between the head portions of the blocks of the two engines, and indicated somewhat diagrammatically at 60, 61 and 62. Interconnection of the lower portions of the jackets and return to the starting engine jacket, is made through pipe 63 and a return connection 64, together with pipe 65 and fitting 66. The starting engine is desirably provided with a circulating pump (not shown) which serves during the starting period to deliver the warmer water from the starting engine jacket, into the main engine jacket for the purpose noted.

Referring further to Fig. 4, the disc or flywheel member 45, which, being secured to shaft 42 always rotates at starting engine speed, is secured as by tie bolts 70, one of which appears in Fig. 4, to a specially formed hollow structure 71 provided with chambers and passages such as 72, the tie bolts 70 also serving to secure the members 71 and 45, into assembly with a rotatable casing body 73. The member 73 serves to define in part, a casing or chamber of substantial size, containing a suitable hydraulic coupling fluid such as oil of suitable characteristics and viscosity, or hydraulic brake fluid or the like. A fluid is preferably employed which does not vary too widely in its physical characteristics, over a substantial range in operating and ambient temperatures. The coupling shown is or may be of the well known Foettinger type, or of the Vulcan-Sinclair type, the structural parts and assembly of each of which have heretofore been known, and since the coupling of itself constitutes no part of the present invention, need not be described in detail. However, according to preference in operation, the coupling is not, as in conventional usage, fully filled with the coupling liquid, the body of which is indicated at 75. It will be noted from Fig. 4 that the preferred coupling arrangement is such that the element 71 is rotatably carried as through bearing 76, on the shaft end 77, the chambered part 72 being identified with the pumping paths of the hydraulic coupling. The companion hollow element indicated at 80, serves to define the turbine paths or passages of the hydraulic coupling, being the driven element thereof, and is secured through hub portion 81 to the shaft 82, an end 83 of which projects beyond the coupling proper and carries, through a key 84, a drive pinion 85; the end 83 of the shaft being journalled in antifriction bearing 86. A holding nut or the like 87 threadedly engages this end of the shaft, and the ball bearing or the like 86 is carried in a journal portion 90 of the frame structure.

The pinion 85 is in contant mesh with the gear 91 secured as by a key 92, to a short shaft section 93. This shaft is journalled at spaced zones in double ball races or the like 94. The bearing arrangement throughout the assembly is preferably such that, except where precluded for operative reasons, the shaft and bearings are permitted a limited axial displacement to care for abruptly-applied longitudinal stresses. For the purpose of support of the outboard bearing 94, there is provided within the housing 32—33 a bearing arm or bracket 95 which serves to carry a coupling, which is, for brevity, referred to as of Bendix type, and to be more fully described. The relation between pinion 85 and gear 91 is preferably such as to effect say a 2:1 speed reduction between the hydraulic coupling and the Bendix drive. This arrangement has been found advantageous in the use of a somewhat higher speed starting engine in connection with a low-speed heavy-duty Diesel or the like.

Proceeding now to a further description of the Bendix drive, the shaft 93 is provided with a moderate pitch, screw threaded portion 100 on which is threaded a pinion 101. Beyond the threaded portion is a sleeved collar 102, the sleeve of which extends within the inner race of the outer bearing assembly 94. Beyond the bearing 94 is a sleeve and collar structure 103, the sleeve portion of which carries a relatively heavy compression spring 104 abutting a nut 105 which is threadedly secured beyond a relatively reduced unthreaded part 106 of the shaft 93. It will appear from the arrangement of the spirally-mounted pinion 101 on the threaded part 100 of shaft 93, that rotation of this shaft, tends, by a travelling-nut action, to force the pinion 101 to the right (Fig. 4) and into engagement with a flywheel ring gear 110 on the flywheel 111 of the main engine. This axial displacement of pinion 101 into mesh with the ring 110 is lightly opposed by a small compression spring 112. However, upon engagement of the gear elements 101—110, the axial stresses in shaft 93 are yieldingly opposed by the compression spring 104 through which the tendency to axial displacement of shaft 93 is opposed by the end face of bearing arm 95. The action of the coupling device is, as thus far described, in important respects the same as that of the usual Bendix coupling or drive, and need not for this reason, be further detailed.

It may here be noted that the coupling is only for convenience referred to as a Bendix drive, it being intended that the invention shall embrace the use of any device of this general order for the ultimate translation of the starting engine torque, to the main engine. It is a preference that some form of connection be employed, which is brought into effect as by axial movement of a driving gear or the like, and it is regarded as essential that this connection or an equivalent be inherently of overrun or unidirectional type.

The operation and control of certain of the individual elements of the combination characterizing the present invention, will be obvious to those skilled in the art and require no detailed discussion. This is true of the starting engine 13 per se, and the main engine 10, the controls of which are or may be conventional.

Preparatory to starting the main engine 10, the coupling assembly (Fig. 4) is checked as to quantity of liquid in the casing 73. Any liquid necessary to be added to this casing is introduced by removal of the detachable cover plate 115 positioned by cap screws or the like 116. Upon removal of the cover plate, oil or other desired liquid is added through the port 117, threaded to receive a filler plug 120. It is to be understood that the coupling is operable, with many advantages over other types of hydrodynamic couplings and particularly with many advantages over the usual types of friction clutch, even though the coupling casing be completely filled, or nearly so, with the liquid, in keeping with the ordinary practice. It is however a distinct preference that the body of fluid 75 be kept at a level approximating 60% of the casing capacity, as it has been found through experiments and experience that a reduction in the usual level of liquid, about to the value stated, provides a markedly easier action of the coupling and more desirable torque and slip curves, the preferred forms of the latter being indicated by the diagram of Fig. 6, hereinafter discussed in detail.

With the casing 73 thus partly filled with liquid, the starting engine 13 is cranked by means of lever 52 and preferably allowed to idle for a short time through an initial warming period, during which its jacket water will be desirably raised in temperature above that of the ambient. After a moderate warming up period of the starting engine, and with the main engine controls positioned for starting, the starting engine throttle 23 is gradually opened, to accelerate it to a speed of say 1200 R. P. M., in accordance with preference in connection with the arrangement presently disclosed. As will appear from the graphic representations of Fig. 6, it is seen that the coupling transmits substantially the full starting engine torque, without delivery of power on its turbine side. As is particularly evident from the uppermost torque curve of Fig. 6, it is apparent that when the starting engine has attained the speed of say 1200 R. P. M., it is at this time developing substantially full torque. Actually the torque peak is attained within a range of 1800–2000 R. P. M., but the torque curve exhibits only a slight variation between a speed of say 1200 R. P. M. on the starting engine, and the top speed thereof which, in the example disclosed, may be taken as 4000 R. P. M.

As the starting engine is accelerated beyond a predetermined point, say 1200 R. P. M., and assuming no undue breakaway friction in the main engine such as the Diesel 10, it will be noted that under normal conditions the main engine begins its starting rotation and its driven speed rather rapidly increased to say 30 R. P. M., during acceleration from 1200 to 1500 R. P. M. of the starting engine. Upon further acceleration of the starting engine say from 1700 to 4000

R. P. M., the main engine is accelerated, of course at a substantially lower rate, but say between 50 R. P. M. and 130 R. P. M. It is in this range that the main engine will normally attain firing speed, in the example selected, this value being in the neighborhood of 75 R. P. M. It will have appeared that, due to the interconnected jacket systems of the two engines, throughout the acceleration of the starting engine its jacket will assist materially in warming the cylinders, block and oil supply in the main engine, with the result of gradually reducing the breakaway friction, or friction-at-rest of the larger unit.

It should be noted that the hydrodynamic coupling of the type herein disclosed, is of sufficient capacity to enable the starting engine to operate for protracted periods under conditions of 100% slip, i. e., with the starting engine developing substantially full torque, and with no transmission of power on the power-delivery side of the coupling. It is partly for this reason that the couplings of the type presently disclosed are greatly preferred in the combination herein described and claimed. It results from the foregoing and other characteristics of the coupling that, in the event the main engine is very cold or for other reasons very difficult to start, the formerly prevalent difficulties met with the use of a friction clutch or the like, evidenced by frequent "stalling" of the starting engine, are entirely obviated by the present arrangement. In case, first, as when cold, the main engine will not turn over at all, the full slip possibilities of the hydrodynamic coupling enable the starting engine to be operated for a protracted period under practically full-load conditions but with the effect of quickly warming up the main engine. Under such a condition, i. e., failure to revolve the main engine, the starting engine merely drops to a speed of say 1200 R. P. M., which provides for full slip through the hydrodynamic coupling; the starting engine then continues to run at this speed under nearly full torque conditions until the common circulation of water through both engine jackets warms the main engine to the point where it will turn over. With static friction gradually altered to kinetic, the main engine after breakaway, is rotated gradually faster until it attains firing speed and disengages the overrun coupling or Bendix drive. Assuming, secondly, that the main engine turns over but requires a protracted period of rotation prior to firing, the continued operation of the starting engine under full torque conditions with the coupling under conditions of partial slip and partial power delivery, will serve continually to improve the conditions making for firing of the main engine. It results from these characteristics of the system discussed, that, because of the smooth action and slip characteristics of the hydrodynamic coupling, rarely is more than one starting operation of the starting engine necessary; further, that likelihood of breakage of connecting gearing and overrun connections such as the Bendix drive illustrated, is minimized, and in fact may become practically unknown. It is further importantly to be noted that, particularly under conditions wherein the hydrodynamic coupling is, say, only 60% filled with the coupling liquid, the transmission assembly exhibits a very desirable slip curve (Fig. 6). While the slip drops sharply beyond say 1200 R. P. M. of the starting engine, the slope of this curve is nevertheless quite gradual between values of 1200 R. P. M. and 2800 R. P. M., and under conditions of normal acceleration of the main engine, desirably and gradually decreases in value to a condition approximating transmission of full power of the starting engine, or say to conditions of 3% slip. It is further to be noted that, even when the coupling structure such as casing 73 is filled with the liquid 75, and with the slip R. P. M. constant, the transmitted torque drops slightly faster than the starting engine R. P. M., and with a partially filled coupling heretofore noted as preferred, this easy action is enhanced to a degree such that the slip under full torque is 100%, say at 1200 R. P. M. of the starting engine, yet only a few percent, at starting engine full speed, which in the described example is taken as 4000 R. P. M.

It is to be noted that the foregoing ranges of speed and characteristics of slip and torque curves are merely exemplary, having been taken from actual installations in successful operation; hence such values are not to be understood as in any way restrictive, since with different forms of starting engine and different types of main engine, it is possible that the exact speed ranges given may be varied markedly from those presently discussed.

The foregoing discussion is related primarily to the performance of the engines and hydrodynamic coupling. It is however important that the driven coupling elements be connected to the main engine through an overrun clutch of some type, and preferably through the Bendix drive of the general type shown and described. It is to be understood that the combination is fully operative with the advantages noted, solely through control of the starting engine and transmission parts by means of the throttle control 23, without dependence upon any ancillary mechanical controls whatever, other than of course the conventional or other controls of the main and starting engine.

It has been found as a distinct advantage in operation, to minimize breakage hazards, and to conduce to smoothness of operation, to provide for a manual engagement of the axially shiftable gear element or pinion such as 101. Particularly is the starting shock on this pinion minimized by making use of a frictional drag, manually applied by the operator to the pinion of the Bendix drive, such as 101 (Fig. 4). Provision for this control is made through a friction shoe 125 (Fig. 5). The position of this shoe or drag may be altered to bring it either in or out of engagement with the pinion 101, as controlled through a plunger 126, operating in a guide bore 127 therefor, which may be formed in an augmented wall portion of the casing structure 33, as appears in Fig. 5. The outer portion of the bore 127 is somewhat enlarged as at 128, to accommodate a spring 130 which seats against the bottom of the bore 128 at one end, and against a handle or knob 131 at its opposite end. The loading of the spring 130 is such as normally to keep the friction drag 125 in a retracted position. This device is preferably employed during the preliminary portion of the starting period after the engine 13 is in operation and idling, but prior to its acceleration to full torque delivery conditions. For example, with the starting engine idling, the knob 131 is pushed inwardly under light pressure just sufficient to bring the shoe element 125 into engagement with pinion 101 and arrest its free rotation. This drag is sufficient to cause an easy axial displacement of the pinion against the loading of the light compression spring 112, thence to bring the pinion 101 into mesh with the ring gear 110. During this engagement, since the starting engine is operating only at low speed and the hydraulic coupling is transmitting practically zero torque, there results at this time no rotation of the main engine by the pinion. This step consists essentially in effecting a positive mechanical connection between the driven elements of the hydraulic coupling assembly, and the main engine, prior to the effective transmission of any starting torque to the latter. It will be understood of course that once the main engine 10 begins to fire, and operates under its own power, the relative torque reversal through the gear elements 110—101 and the coaction of the latter with the threaded portion 100 of shaft 93, serves immediately and positively to disengage the pinion 101, as will be well understood. Since the latter operation may take place abruptly, the backward traveling action of the pinion 101 as biased by spring 112 will tend to cause an impact between the pinion and the bearing assembly 94. For the purpose of preventing this effect, there is provided (Fig. 5), a key 135 positioned by a screw or the like 136, in a keyway 137, the key and screw being fully embraced by the keyway so as to obviate any interference with the bearing race of assembly 94. It will be noted that the key 135 is provided with a bevelled end portion, corresponding as to angularity, to a spiral face 140 on the left hand side (Fig. 5) of the pinion 101. The key and spiral surface coact, as the pinion is kicked back upon firing of the main engine, in gradually arresting the rotation of the pinion, and in precluding its impact with the adjacent bearing assembly and partition.

The foregoing description of the elements, combinations and methods utilized in connection with the invention have related with some particularity, to certain proven operative assemblies. With a realization of the possibilities of variation of structure and behavior characteristics of the coupling, it is important to note that the ideally desirable operating characteristics of the coupling cannot be obtained through use of a coupling entirely filled with its liquid. Under the last named conditions, i. e., a filled coupling, experiments and calculations have shown that even with a six or seven percent slip at 4000 R. P. M. on the starting engine, this slip would not reach a full 100% at 1200 R. P. M., as is desired. However, by varying the amount of the coupling liquid to arrive at an optimum proportion of liquid-filled to unfilled space therein, as in the present example by filling the coupling casing about 60%, the slip curves as shown by Fig. 6 are closely approached, and result in a slip value of about 100% at substantially 1200 R. P. M., and do not materially exceed values of the order of 3% to 6% at 4000 R. P. M. starting engine speed.

A protracted series of experiments and experience have shown that the coupling assembly and method of operation outlined herein, serve fully to attain each of the objects hereinabove expressed as well as the desirable characteristics of operation as set forth and implied from the whole disclosure.

Inasmuch as the description has related to a single preferred embodiment and method, it is to be understood as exemplary, and not as limiting in any sense, the full intended scope of the invention as defined by the claims hereunto appended.

I claim:

1. The combination with an internal combustion water-jacketed engine and a water-jacketed starting engine therefor, of means connecting the water jackets of said engines to provide for fluid circulation therebetween, and means for connecting the drive shafts of said engines, said means including a hydraulic coupling of a type capable of operation under full speed slip for protracted periods and adapted for control by acceleration of the starting engine to reduce the speed slip, through a substantial range of speed of the starting engine, beyond the speed range in which the starting engine develops substantially full torque, and a mechanical coupling of Bendix type operatively interposing said hydraulic coupling and the main engine, said mechanical coupling including a pinion threaded on a drive shaft for axial displacement into and out of meshing engagement with a gear connected to the main engine drive shaft, a friction shoe engageable with said pinion for restricting rotation thereof to effect an axial displacement of the pinion, and manual control means for said friction shoe.

2. The combination of a water-jacketed internal combustion engine and a water-jacketed starting engine therefor, conduits interconnecting the jackets of said engines to provide for fluid circulation therebetween, means for connecting the drive shafts of said engines, said means including a hydraulic coupling of a type characterized by pumping paths and driven paths in communication, together with an enclosing casing, and in which the casing is distinctly less than completely filled with a coupling liquid, whereby said hydraulic coupling is adapted to operate with 100% slip when the starting engine is supplying full torque at reduced speed, and with initial rapidly decreasing slip when the starting engine is accelerated to full speed, and a mechanical coupling of Bendix type operatively interposing said hydraulic coupling and the main engine, said mechanical coupling including a pinion threaded on a drive shaft for axial displacement into and out of meshing engagement with a gear connected to the main engine drive shaft, a friction shoe engageable with said pinion for restricting rotation thereof to effect an axial displacement of the pinion, and manual control means for said friction shoe.

CARL H. VAUPEL.